United States Patent
Evans et al.

Patent Number: 5,709,166
Date of Patent: Jan. 20, 1998

[54] REFRIGERATED AUTOMATIC FISH FEEDER

[76] Inventors: Cheryl Rae Evans, 2408 Santa Ana Ave., Costa Mesa, Calif. 92627; Jim Mankowski, 684 Seacoast Dr., Imperial Beach, Calif. 91932

[21] Appl. No.: 612,664

[22] Filed: Mar. 8, 1996

[51] Int. Cl.$^6$ .................................................. A01K 5/02
[52] U.S. Cl. ........................ 119/51.04; 119/51.11; 119/56.1
[58] Field of Search ........................ 119/51.04, 51.11, 119/56.1, 57.92, 51.5, 61

[56] References Cited

U.S. PATENT DOCUMENTS

| | | | |
|---|---|---|---|
| 3,688,744 | 9/1972 | Kaplan | 119/51.11 |
| 3,934,038 | 1/1976 | Kerr | 426/1 |
| 4,279,220 | 7/1981 | Kurkurba | 119/51.04 |
| 4,889,077 | 12/1989 | Possis | 119/51.11 |
| 4,981,106 | 1/1991 | Nagatomo | 119/51.11 |
| 5,067,443 | 11/1991 | Hurnik et al. | 119/71 |
| 5,133,292 | 7/1992 | Kirk | 119/51.04 |
| 5,398,643 | 3/1995 | McElrath et al. | 119/51.11 |

FOREIGN PATENT DOCUMENTS

| | | |
|---|---|---|
| 475583 | 4/1972 | Australia . |
| 2305127 | 11/1976 | France . |
| 515277 | 1/1993 | Japan . |
| 843889 | 7/1981 | U.S.S.R. . |
| 1044246 | 9/1983 | U.S.S.R. . |
| 2170087 | 7/1986 | United Kingdom . |
| 2183984 | 6/1987 | United Kingdom . |

*Primary Examiner*—John G. Weiss
*Assistant Examiner*—John M. Black
*Attorney, Agent, or Firm*—Dennis W. Beach

[57] ABSTRACT

The refrigerated automatic fish feeder is an insulated cylindrical container having a removable cover and a motor driven rotating food tray. The food tray has food tray compartments to hold food and each food tray compartment has a trap door to allow dispensing of food at predetermined time intervals. The insulated container has a food drop door which opens at the same time as the trap door to allow the food to drop from the fish feeder into a fish tank. The fish feeder is cooled by use of a thermal electric device thermally connected between an external heat sink with a fan to dissipate heat and an internal heat sink. The movement of the food tray to dispense food and the operation of the thermal electric device for cooling is accomplished by an operation and control circuit having a fail safe circuit.

3 Claims, 6 Drawing Sheets

REFRIGERATED AUTOMATIC FISH FEEDER

BACKGROUND OF THE INVENTION

1. Field of the Invention

This invention relates to devices used to automatically dispense food to fish or other animals. The new device provides a means to refrigerate food until such time as the food is dispensed at regulated time intervals.

2. Description of Related Art

There are currently in use various devices for automatic dispensing of food to fish and other animals. For example, a rotational automatic fish feeding apparatus for dry fish food is disclosed in U.S. Pat. No. 3,688,744. This device has no provision for refrigeration or individual food storage and dispensing means. Another example of an automated feeding device that is currently in the art is G.B. Patent No. 2,170,087A. This apparatus has a rotating central core and circular base with feeding bowls contained therein. In this instance the food is not dispensed, but instead access to feeding bowls is allowed through an opening. With each rotation another feeding bowl is exposed. In this art, there is provision for a heat exchanger to cool the unexposed feeding bowl contents. The heat exchanger is wrapped around the inside sides of the apparatus, but no disclosure of the heat exchanger mechanism is in the patent.

The present invention provides a means to refrigerate the food in a closed environment and dispense the food automatically at regulated time intervals. The refrigerated automatic fish feeder allows the use of frozen or dried food to feed fish and other animals. Current art does not provide the compact automatic feeding and refrigeration in a closed consistent environment. The use of a closed container with a rotating tray and heat exchanger allows food to be kept at low temperature including being frozen for a longer period of time. This simple device allows a longer period of time between services of the feeder as apposed to existing art which is not sealed to maintain cold temperatures or lacks the simple heat exchange system of the instant device.

SUMMARY OF THE INVENTION

A primary objective of the present invention is to provide a means to dispense food to fish and other animals at regulated time intervals wherein the stored food may be kept cold or frozen until dispensed. It is a further object of the invention to provide for dispensing of specific quantities of food at each regulated time interval.

In accordance with the description presented herein, other objectives of this invention will become apparent when the description and drawings are reviewed.

DESCRIPTION OF THE PREFERRED EMBODIMENT

Figure 1:
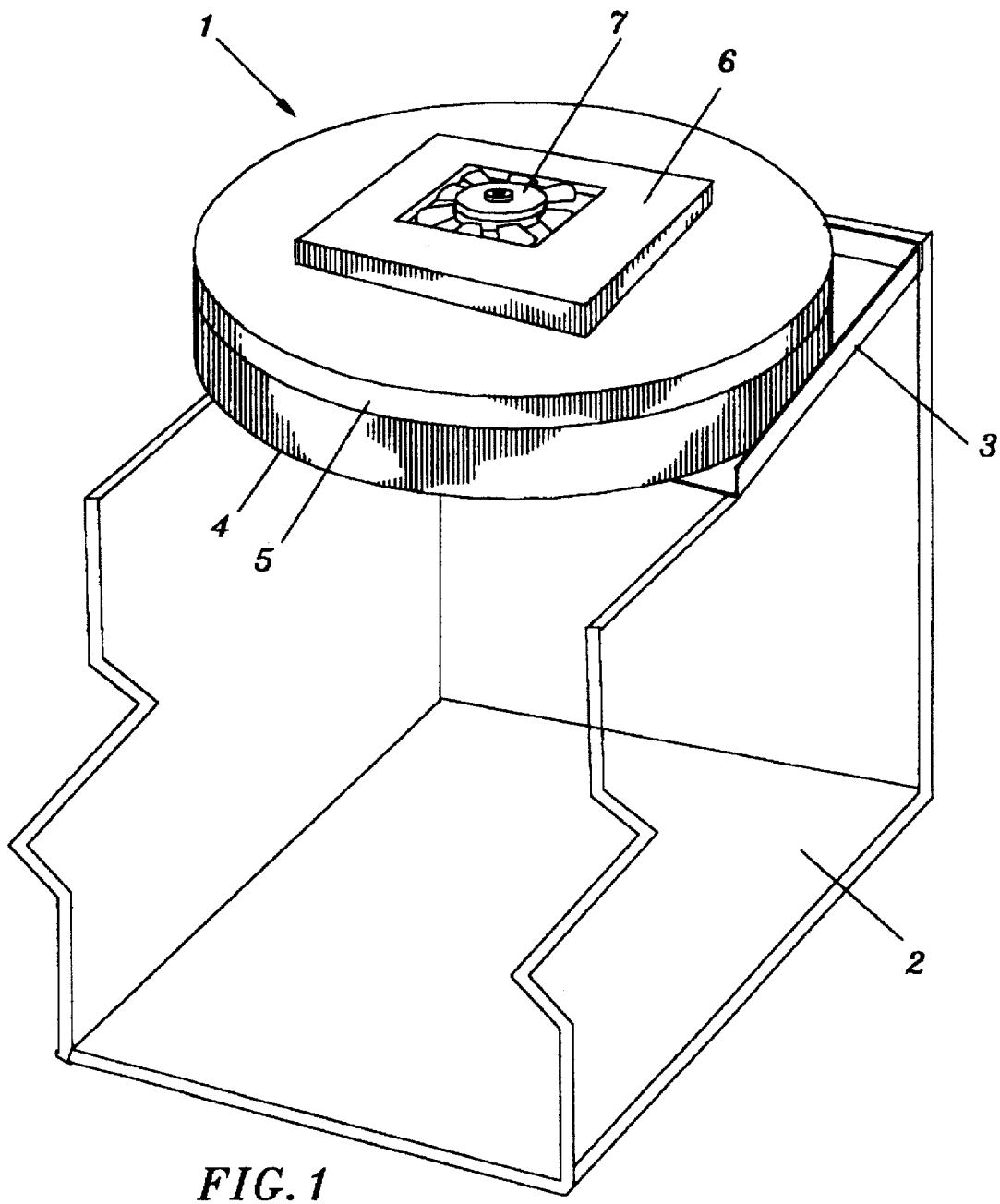
FIG. 1 illustrates a perspective view of the fish feeder mounted on an aquarium.
Figure 3:
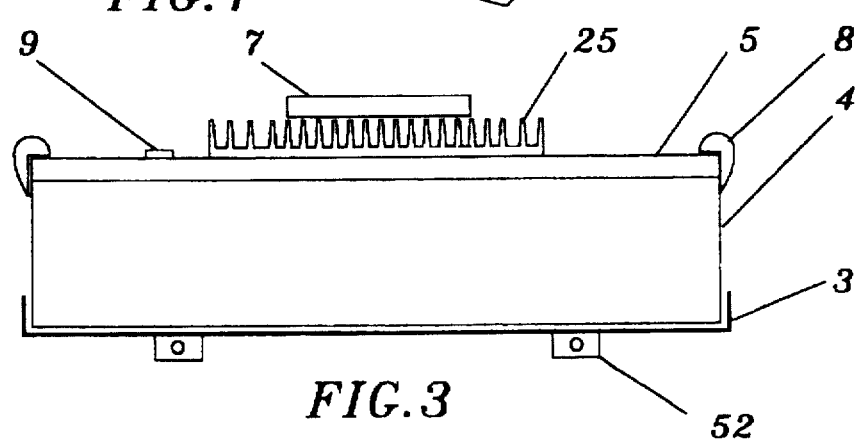
FIG. 3 illustrates a side elevation view of the fish feeder.
Figure 2:
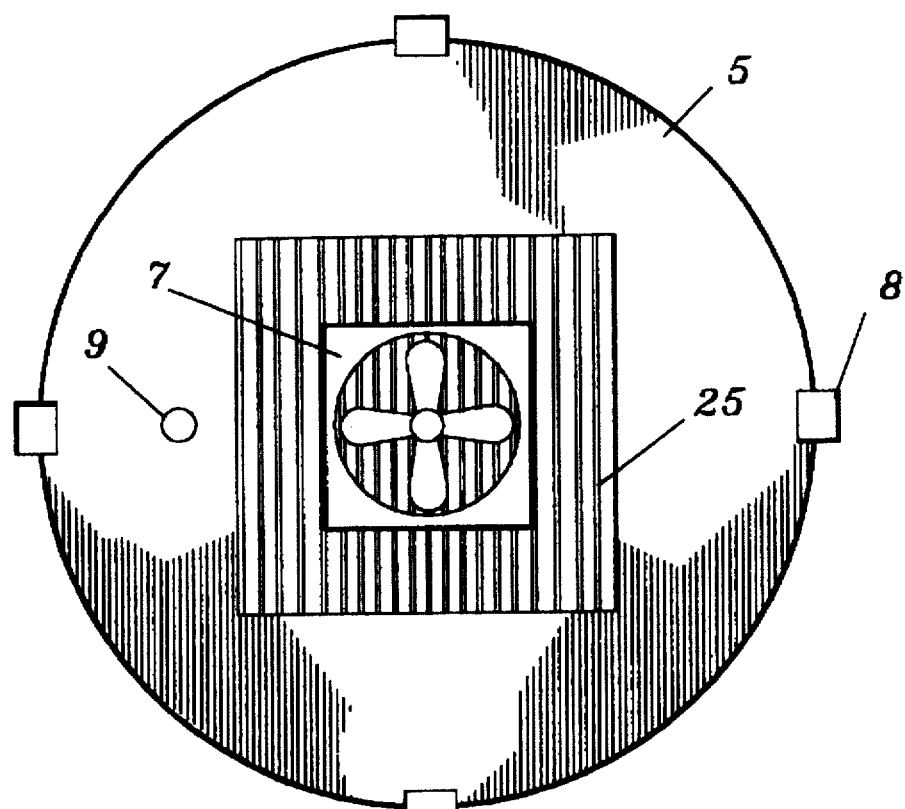
FIG. 2 illustrates a top view of the fish feeder.

The refrigerated automatic fish feeder device provides a means to automatically feed aquarium fish or other animals frozen or cooled dry food. This may be done over a period of time without the requirement of supplying the feeder with additional food. The fish feeder has individual bins for food which are on a food tray in a closed container such that the food may be kept cool or frozen for periods of time such as a month. The device has operational and control circuitry that rotates the food tray at regulated time intervals to cause food doors to open and dispense food. Other than when a food door opens to dispense food, the food tray is maintained in a closed environment such that the food may be kept frozen until dispensed.

Referring to FIGS. 1 through 4, a fish feeder (1) is shown mounted on a fish aquarium (2) by means of a mounting bracket (3) which may have attachment brackets (52). The fish feeder (1) is cylindrical in shape with an insulated container (4) usually made of polyurethane and a cover (5) or lid also of polyurethane. There is mounted on the cover (5) a heat sink shroud (6) on which a fan (7) is mounted. The insulated container (4) and cover (5) have one or more latches (8) to retain the cover (5) to provide a closed environment in which the food is stored. There is also an external power connector (9) for attachment to a power source (not shown) to provide electric power to the fish feeder circuitry.

Figure 4:
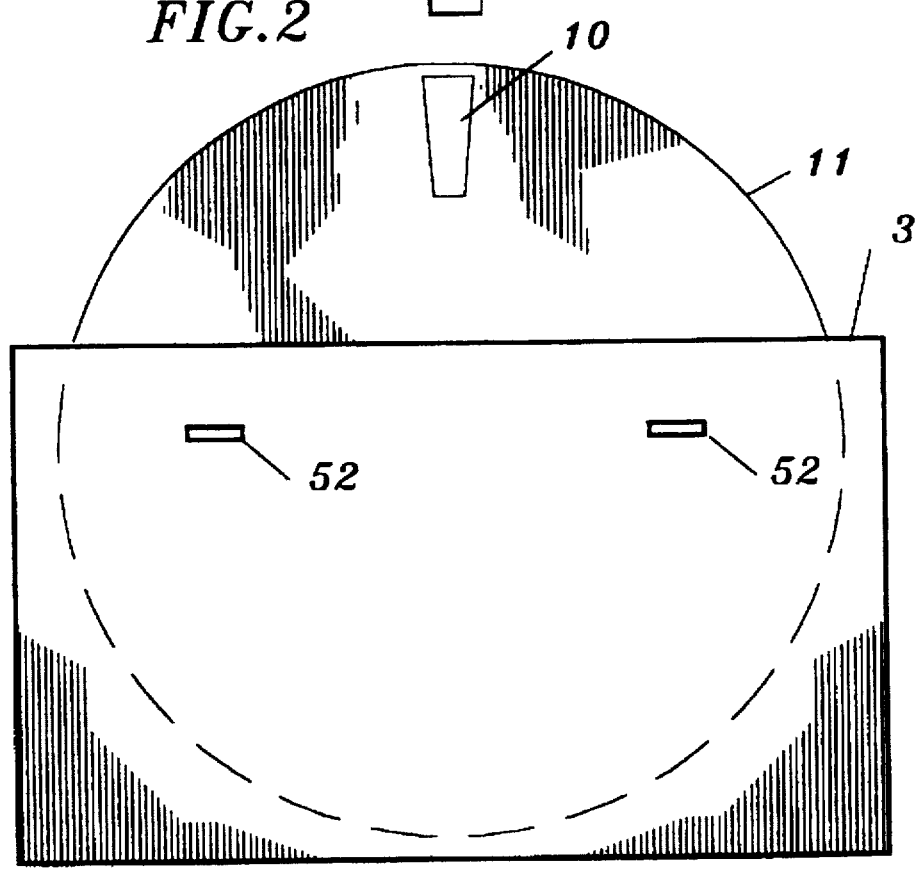
FIG. 4 illustrates a bottom view of the fish feeder with mounting frame.

Referring to FIG. 4, the insulated container (4) has food drop door (10) contained in the insulated container bottom (11). The mounting bracket (3) is shaped such that the food drop door (10) is positioned over the area in which the stored food is to be dispensed such as over the water in the fish aquarium (2).

Figure 5:
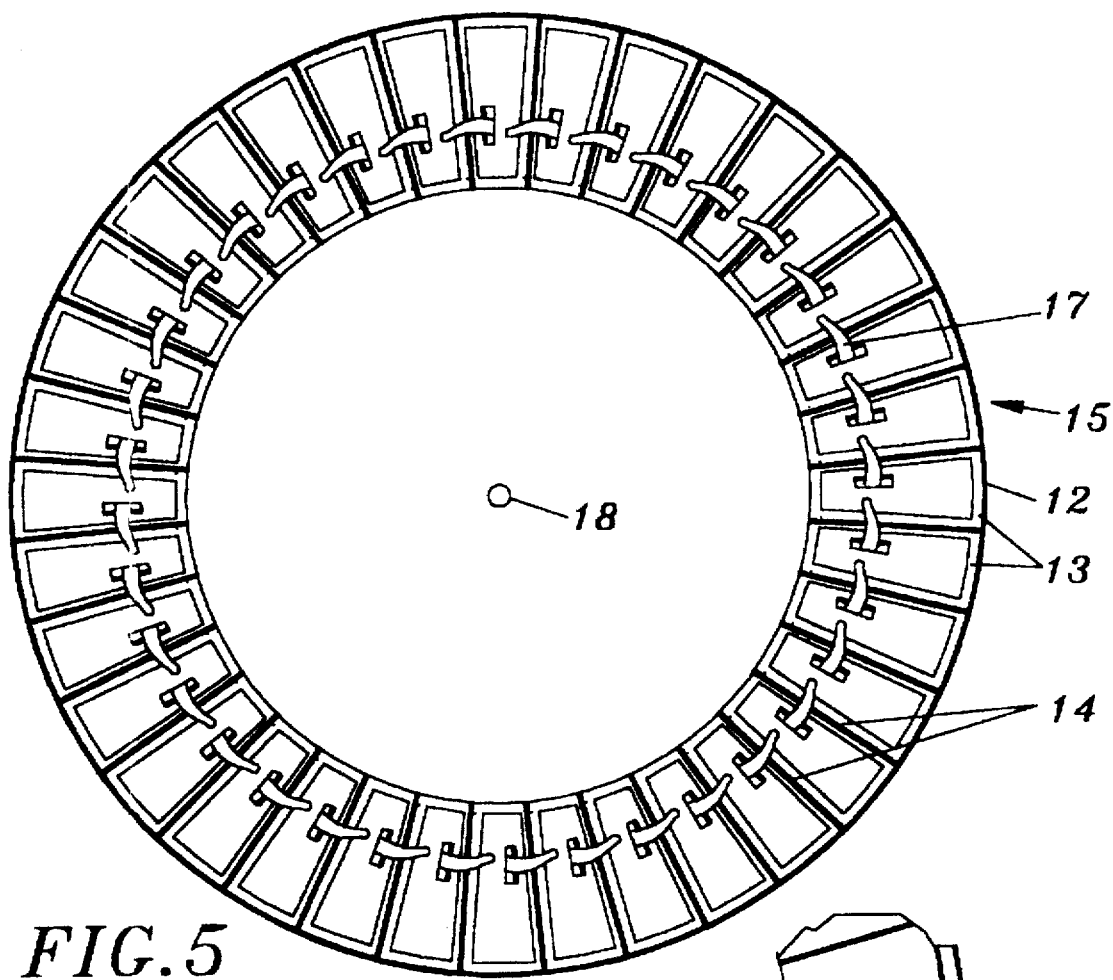
FIG. 5 illustrates a top view of the rotating food tray.
Figure 6B:
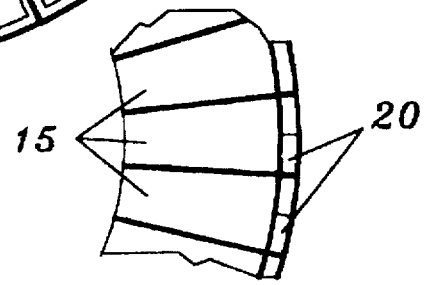
FIG. 6 illustrates the food dispensing.
Figure 6A:
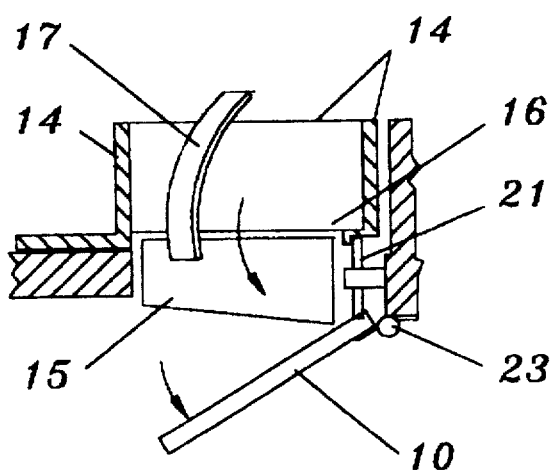
Figure 6C:
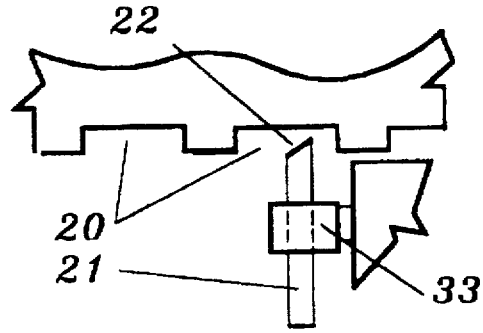

Referring to FIGS. 5 and 6, a top view of the rotatable food tray (12) with food tray compartments (13) is illustrated. The food tray (12) has a pivot bearing aperture (18). The food tray compartments (13) with compartment walls (14) provide for individual storage of specific quantities of food to be dispensed. The food tray compartments (13) have a hinged trap door (15) in the compartment bottom (16). The trap door (15) has attached a door actuator pin (17) which is used to open the trap door (15).

Figure 7:
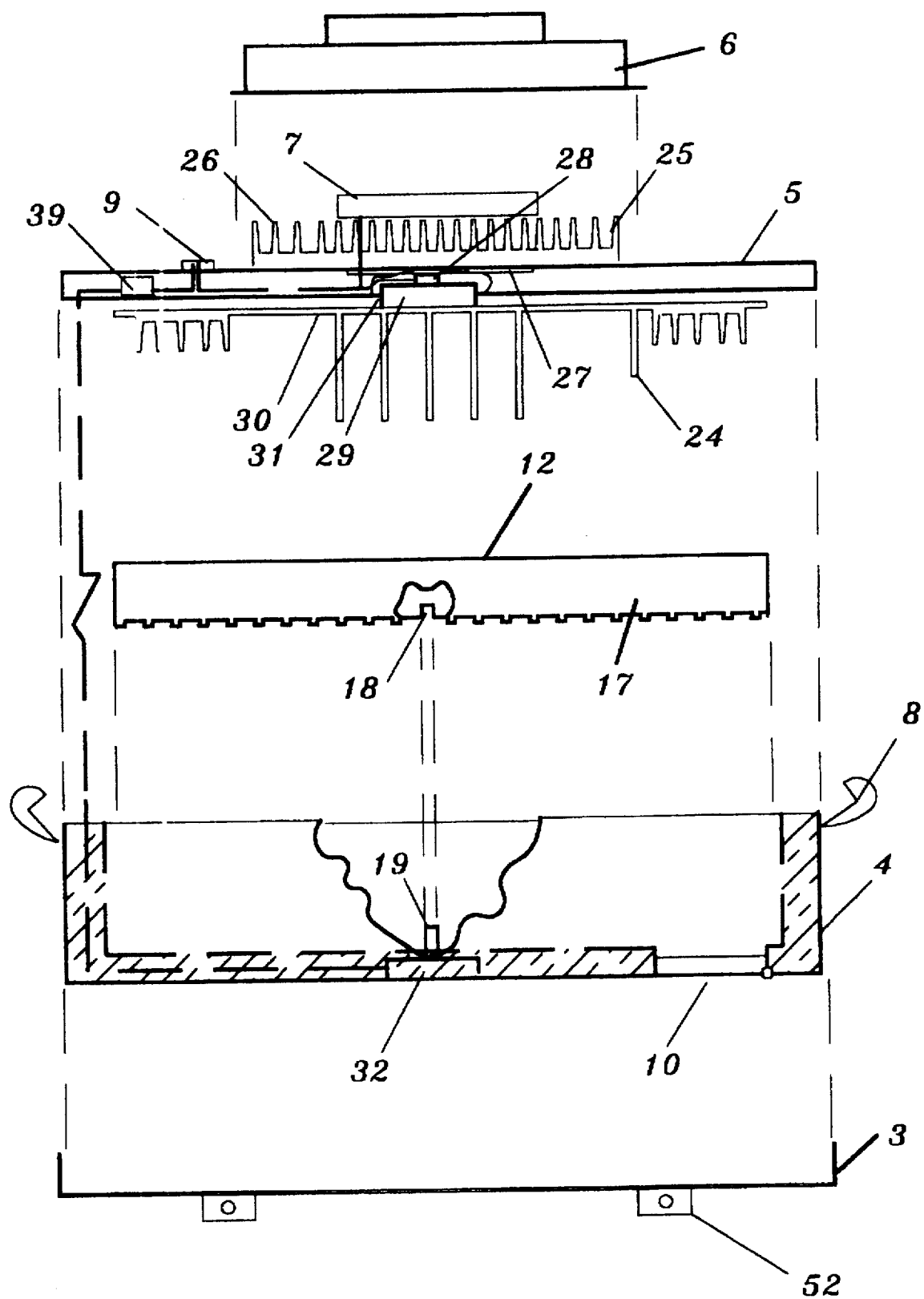
FIG. 7 illustrates an exploded side elevation view of the fish feeder.

Referring to FIGS. 6 and 7, the food tray (12) is mounted in the insulated container (4) on the electric motor shaft (19) by means of the pivot bearing aperture (18). The food tray (12) has a food trap door (15) associated with each food tray compartment (13). The food door trip pin (21) slidably mounted in a trip pin holder (33) attached to the container bottom (16) seats in a slot (20) when the food is not being dispensed. When the food tray (12) is rotated by the electric motor (32) to the next food tray compartment (13), the trip pin (21) incline (22) pushes the trip pin (21) down against the food drop door (10) thereby pivoting it on food drop door hinge (23) and opening it. The food drop door hinge (23) is sprung to keep the food drop door (10) normally closed.

At the same time the food drop door (10) is opened, the trip lever (24) engages the door actuator pin (17) to rotate the trap door (15) to open and allow the food to fall out of the food tray compartment (13).

The cover (5) has an external heat sink (25) of aluminum mounted on the exterior of cover (5). The fan (7) is mounted on the heat sink (25) which is covered by the heat sink shroud (6). The heat sink (25) is 10 inches in diameter and ½ inches or more thick with radiating fins (26). On the side opposite the radiating fins (26) a 5 inch diameter, ⅛ to 1/16 inch copper heat coupler (27) is thermally connected to the heat sink (25). The heat coupler (27) has a thermoelectric device (28) thermally connected to the heat coupler (27) and a cold plate extender (29) is than thermally attached to the thermoelectric device (28). The cold plate extender (29) of aluminum is then thermally connected to the cold plate (30) of aluminum which is under the cover (5) and thereby located in the insulated container (4) when the cover (5) is closed. The cold plate extender (29) passes through cover aperture (31).

This described structure provides an aluminum cold plate (30) in the fish feeder (1) which is thermally linked to the heat sink (25). The thermoelectric device (28) utilizes the Peltier effect, discovered in 1834. The device consists of a number of p and n type pairs connected electrically in series and placed between two ceramic plates. When the thermoelectric device (28) is connected to a DC power source, current causes heat to flow from one side of the thermoelectric device (28) to the other which creates a hot side and a cold side. In the fish feeder (1) application the thermoelectric device cold side is connected through cold plate extender (39) to the cold plate (30) and the hot side through heat coupler (27) to the heat sink (25).

The copper heat coupler (27) has twice the thermal transfer rate of the aluminum cold plate (30). When power is applied the electron flow is toward the copper and heat flows from the cold plate (30) to the heat sink (25) where it is dissipated by the fan (7). Both copper and aluminum have good thermal energy transfer.

Figure 8:
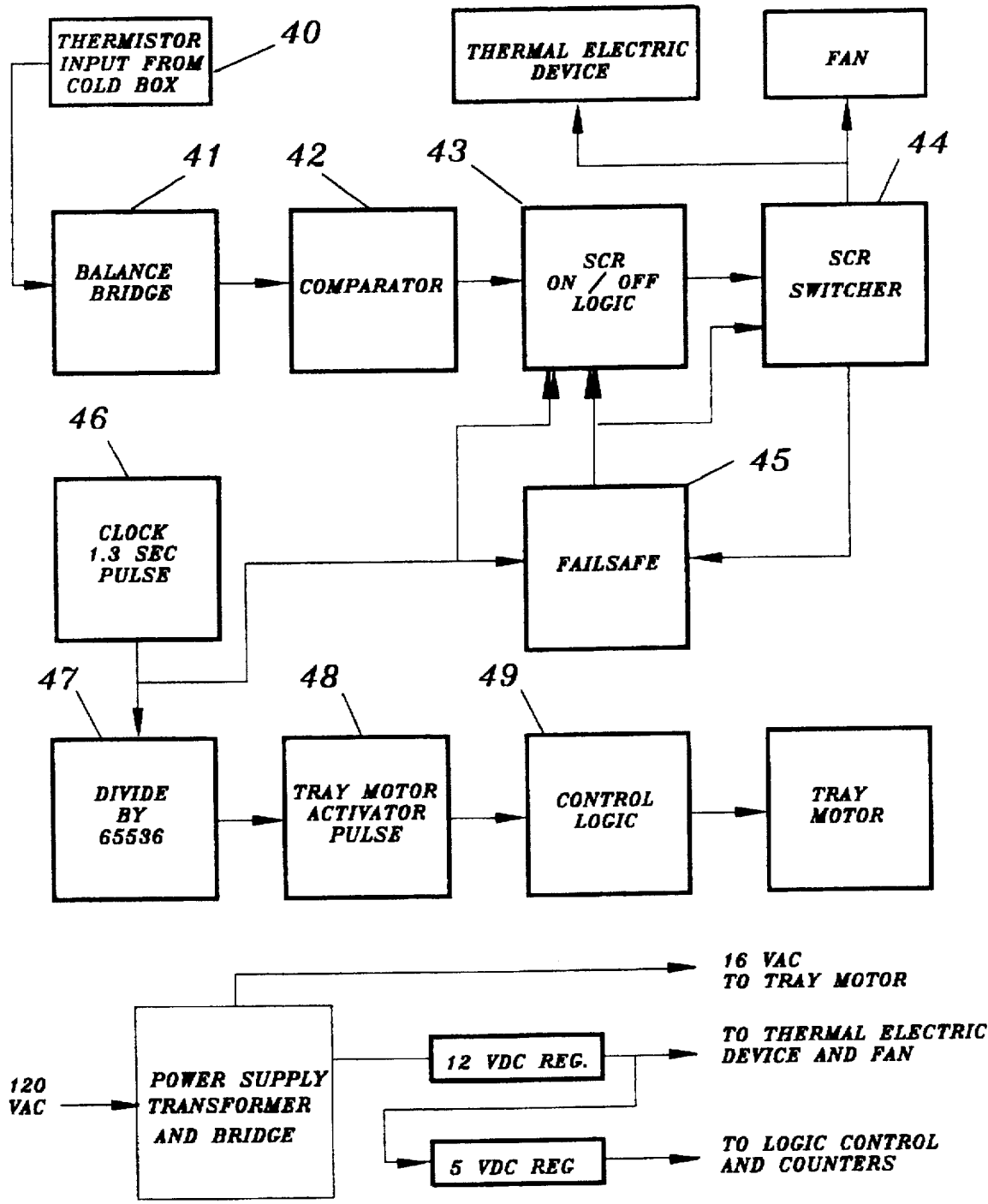
FIG. 8 illustrates a block diagram of the operation and control circuitry.

Referring to FIG. 8, the operation and control circuitry (39) acts to keep the cold plate (30) at approximately 0 degrees Fahrenheit which with the Peltier effect and the thermoelectric device (28) means the heat sink (25) must be kept at approximately 100 degrees Fahrenheit by the fan (7). There is a thermistor (40) mounted in the fish feeder (1) and electrically connected to the balance bridge (41) to monitor temperature. The balance bridge (41) is electrically connected to a comparator (42) to determine activation or de-activation of the cooling circuitry. The comparator (42) is electrically connected to an on-off logic switch (43) which in turn is connected to a switcher (44) both of which are SCR devices. The switcher (44) activates both the thermoelectric device (28) and the fan (7) when cooling is necessary.

Figure 9:
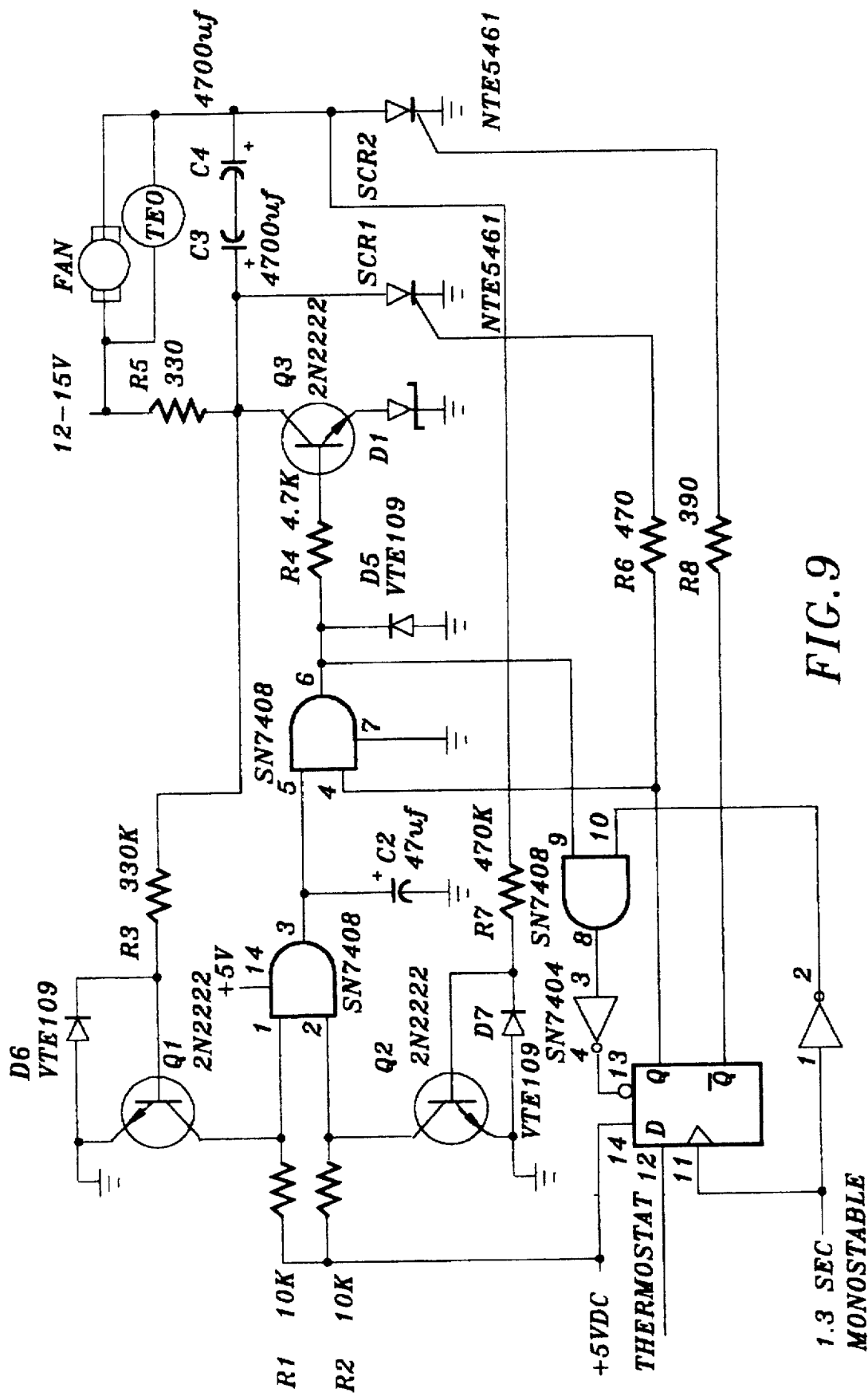
FIG. 9 illustrates a schematic of the fail safe circuitry.

There is a fail safe (45) circuit as illustrated in FIG. 9. The on-off logic switch (43) and switcher (44) may not have the capacitors C3 and C4 properly charged or they may have lost charge due to SCR 1 and SCR 2 having been triggered on at the same time due to transients. To correct for this condition the fail safe (45) circuit is used.

If capacitors C3 and C4 are discharged, SCR 1 and SCR 2 are both on. This will turn off both transistors Q1 and Q2 providing a binary 1 to pins 1 and 2 of the first AND gate which will in turn make pin 5 of the second AND gate a binary 1. As long as cooling is required there is no problem. When the desired temperature is reached the Q output of the D latch transitions to a binary 1 to turn on SCR 1 and in turn to turn off SCR 2. If the capacitors are not charged the transition will not occur.

Therefore, the binary 1 signal at the Q output of the D-latch will send a binary 1 to pin 4 of the second AND gate causing pin 6 to transition to binary 1 thus turning on transistor Q3. Transistor Q3 collector to emitter voltage when saturated is much lower than the normal forward drop of SCR 1. This condition will reduce current in SCR 1 thereby turning it off. Pin 9 of the third AND gate is a binary 1 and pin 10 will transition to a binary 1 when the second half of the clock pulse transitions to zero. When this occurs, pin 4 of the inverter 7404 transitions to binary 0 resetting the output Q of the D-latch to a binary 0. This will turn off transistor Q3 which is in parallel with the now off SCR1 enabling the capacitors to charge their correct polarity. When the clock pulse returns to a positive voltage, the output Q of the D-latch returns to a binary 1 and the SCR 1 turns on and turns off SCR 2.

The operation and control system is based on a 1.3 second pulse clock (46). To operate the motor (32) to rotate the food tray (12) the clock (46) pulse is divided by divider (47) and electrically connected to a tray motor activator pulse circuit (48). The activator pulse circuit (48) operates a motor control logic module (49) which in turn steps the motor (32).

We claim:

1. An apparatus to maintain fish food at a temperature lower than the surrounding environment and to dispense the fish food at predetermined intervals comprising:

an insulated container having a cover retained by a means for attachment;

the cover having a heat sink mounted thereon which heat sink has a fan mounted thereon and the heat sink covered by a heat sink shroud;

the cover having an external power connector and a means for operation and control of a fish feeder;

the insulated container having a container bottom in which there is a food drop door mounted on a hinge and said container bottom having a motor with a motor shaft;

a food tray rotatably mounted on the motor shaft at a pivot bearing aperture wherein the food tray having a plurality of food tray compartments which have compartment walls and a trap door in a compartment bottom;

a door actuator pin attached to the trap door to rotate open the trap door when the door actuator pin is engaged by a trip lever;

the food tray having a slot associated with each food tray compartment wherein the slots are located on an outer bottom edge of the food tray to engage a trip pin having an incline which trip pin is slidably mounted in a trip pin holder attached to the container bottom; and a heat coupler attached to the heat sink wherein the heat coupler is thermally connected through a cover aperture to a cold plate by means of a cold plate extender and a thermal electric device wherein the thermal electric device is connected to facilitate the movement of warm air out of the fish feeder.

2. The apparatus according to claim 1 wherein the operation and control means for the fish feeder is comprised of a thermistor measurement from the insulated container electrically connected to a balanced bridge which is evaluated by a comparator electrically connected to an on/off logic switch circuit to control a switcher which controls the fan and the thermal electric device wherein there is a fail safe circuit means electronically connected to the on/off logic switch circuit and the switcher; and a clock electrically connected to the on/off logic switch circuit and the fail safe circuit means and the clock electronically connected to a divider which is electronically connected to an activator pulse circuit which is electronically connected to a motor control logic module to control the motor.

3. The apparatus according to claim 2 wherein the fail safe circuity means comprises three AND gates, three transistors and a D-latch circuit electronically connected by electronic circuits and components to the switcher, the logic switch, the fan and the thermal electric device in a logic sense to cause the D-latch to properly turn on and turn off a silicon rectifier in the logic switch and the switcher no matter what the charge condition of a pair of bias capacitors for the silicon rectifiers.

* * * * *